(12) United States Patent
Hybertson et al.

(10) Patent No.: US 7,772,414 B1
(45) Date of Patent: Aug. 10, 2010

(54) PROCESS FOR PRODUCING BIODIESEL FUEL PRODUCTS

(75) Inventors: Brooks Michael Hybertson, Boulder, CO (US); Brian N. Hansen, Longmont, CO (US)

(73) Assignee: Aerophase, Inc., Longmont, CO (US)

( * ) Notice: Subject to any disclaimer, the term of this patent is extended or adjusted under 35 U.S.C. 154(b) by 98 days.

(21) Appl. No.: 11/939,267

(22) Filed: Nov. 13, 2007

Related U.S. Application Data

(60) Provisional application No. 60/865,717, filed on Nov. 14, 2006.

(51) Int. Cl.
C11C 1/10 (2006.01)
C11B 1/10 (2006.01)
(52) U.S. Cl. .............. 554/169; 554/9; 554/12
(58) Field of Classification Search ............ 554/9, 554/12, 13, 167, 169
See application file for complete search history.

(56) References Cited

U.S. PATENT DOCUMENTS

| | | | |
|---|---|---|---|
| 5,939,571 A * | 8/1999 | Foidl ............ | 554/12 |
| 6,248,910 B1 * | 6/2001 | Franke .......... | 554/12 |
| 6,570,030 B2 * | 5/2003 | Goto et al. ..... | 554/167 |
| 6,887,283 B1 | 5/2005 | Ginosar | |
| 6,960,672 B2 | 11/2005 | Nakayama | |

OTHER PUBLICATIONS

Usta, Use of tobacco seed oil methyl ester in a turbocharged indirect injection diesel engine, 2004, Biomass & Bioenergy, vol. 28, pp. 77-86.*

Friedrich, et al., Petroleum-free extraction of oil form soybeans with supercritical CO2, 1982, JAOCS, vol. 59, No. 7, pp. 288-292.*

King et al., On-line suprcritical fluid extraction-supercritical fluid reaction-capillary gas chromatography analysis of the fatty acid compoisiton of oilseeds, 1992, vol. 344, pp. 474-478.*

Bunyakiat K, Makmee S, Sawangkeaw R, and Ngamprasertsith S. Continuous Production of Biodiesel via Transesterification from Vegetable Oils in Supercritical Methanol. Energy & Fuels 20: 812-817, 2006.

Cao W, Han H, and Zhang J. Preparation of biodiesel from soybean oil using supercritical methanol and co-solvent. Fuel 84: 347-351, 2005.

(Continued)

*Primary Examiner*—Porfirio Nazario-Gonzalez
*Assistant Examiner*—Yate' K Cutliff

(57) ABSTRACT

A method for producing a biodiesel fuel product from biological material is disclosed which comprises extracting lipids from the biological material with a pure or alcohol-modified supercritical fluid in an extractor, passing the extract directly into a reactor wherein a transesterification reaction is induced between the extracted lipids and alcohol with additional alcohol added if needed, forming glycerol and fatty acid alkyl esters, passing the mixture into one or more separators to remove the glycerol and fatty acid alkyl ester products, removing wastes, and recycling the critical fluid solvent and unreacted alcohol to the extractor. An improvement to biodiesel preparation is afforded by the simplification of the extraction and reaction processes into a single flowing system. According to the invention, a biodiesel fatty acid alkyl ester product can be prepared directly from biological material feedstock, such as oil-containing seeds, without the need for prior isolation of the oil.

12 Claims, 5 Drawing Sheets

OTHER PUBLICATIONS

Figure 1:
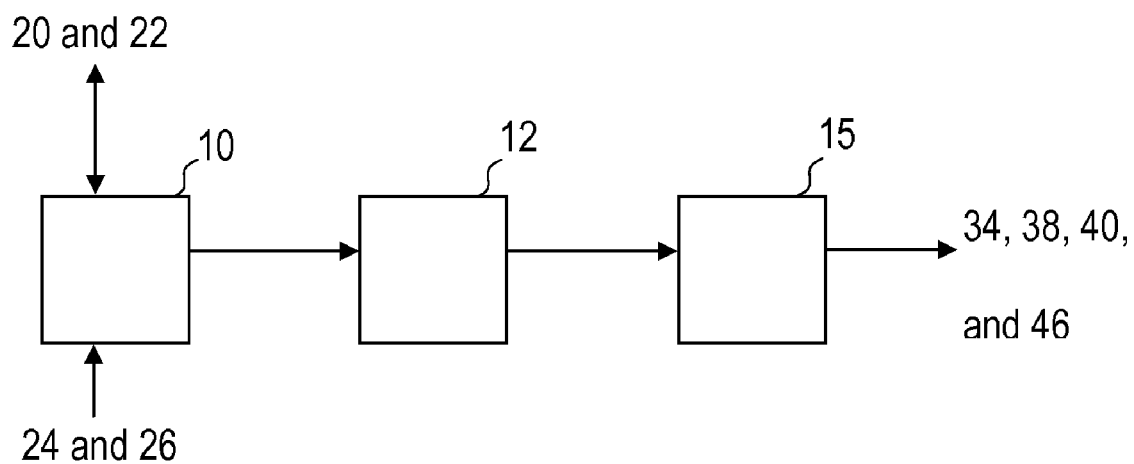

Demirbas A. Biodiesel production from vegetable oils via catalytic and non-catalytic supercritical methanol transesterification methods. Progress in Energy and Combustion Science 31: 466-487, 2005.

Han H, Cao W, and Zhang J. Preparation of biodiesel from soybean oil using supercritical methanol and CO2 as co-solvent. Process Biochemistry (Oxford, United Kingdom) 40: 3148-3151, 2005.

Kusdiana D and Saka S. Two-step preparation for catalyst-free biodiesel fuel production: Hydrolysis and methyl esterification. Applied Biochemistry and Biotechnology 113-116: 781-791, 2004.

Madras G, Kolluru C, and Kumar R. Synthesis of biodiesel in supercritical fluids. Fuel 83: 2029-2033, 2004.

Saka S. and Kusdiana D. Biodiesel fuel from rapeseed oil as prepared in supercritical methanol. Fuel 80: 225-231, 2001.

Warabi Y, Kusdiana D, and Saka S. Biodiesel fuel from vegetable oil by various supercritical alcohols. Applied Biochemistry and Biotechnology 113-116: 793-801, 2004.

* cited by examiner

PROCESS FOR PRODUCING BIODIESEL FUEL PRODUCTS

CROSS-REFERENCE TO RELATED APPLICATIONS

This application is entitled to the benefit of U.S. Provisional Patent Application No. 60/865,717 filed Nov. 14, 2006 by Hybertson and Hansen

STATEMENT REGARDING FEDERALLY SPONSORED RESEARCH AND DEVELOPMENT

Not applicable.

BACKGROUND

1. Field of Invention

This invention relates to a process for producing biodiesel alkyl esters from biological feedstock materials wherein a flowing system containing a supercritical fluid and an alcohol at elevated temperature and pressure is used to extract biological fats and oils from biomass feedstock and transport the extracted material directly into a reaction chamber that is maintained at a separate reaction temperature wherein a transesterification reaction is carried out between the extracted fats and oils and the alcohol with or without the involvement of a separate catalyst and with or without the introduction into the reaction chamber of additional alcohol. A typical supercritical fluid used would be carbon dioxide, and a typical alcohol used would be methanol or ethanol. The extraction step and the reaction step are carried out with the supercritical fluid and alcohol solution pressurized and heated to a supercritical or subcritical state. According to the present invention, an improvement to biodiesel preparation is afforded by the simplification of the extraction and reaction processes into a single flowing system. Also according to the invention, a fatty acid alkyl ester product which can be effectively utilized as a biodiesel fuel substance can be efficiently prepared directly from biomass inputs without the need for prior extraction or other oil isolation processes.

2. Description of Prior Art

Biodiesel fuel, consisting of alkyl esters of fatty acids, is most commonly produced from oilseed feedstock through a series of disconnected steps. Typically the plant triglycerides are first isolated by crushing and grinding the seed and then expeller pressing the pulverized seed to release the oils. This intermediate product is then processed to dry it and remove free fatty acids. Then the purified oil is utilized in a transesterification reaction with a short chain alcohol such as methanol, along with a solution phase acid or base catalyst, typically a strong base such as sodium hydroxide, to facilitate the reaction and heated for several hours to form alkyl esters of the fatty acids and glycerol. Then the fatty acid alkyl esters are isolated and further purified to yield a biodiesel fuel.

In attempts to improve on the reaction rates, yields, and the purity of the products, it has been determined that high pressure, high temperature methanol can be used without an added solution phase catalyst in the transesterification of isolated vegetable oil (7, 13). Notably, this reaction is relatively insensitive to the presence of water compared to the base or acid-catalyzed transesterification reactions most frequently used (9). Research groups at many locations around the world have published or otherwise disclosed transesterification reactions of triglycerides using supercritical methanol as a reaction medium and reactant (1-8, 10-22).

The prior art clearly teaches that biodiesel fatty acid alkyl esters can be formed by the transesterification of vegetable oils with alcohols in supercritical fluids. In the prior art, the supercritical fluids are either composed of an alcohol such as methanol or are composed of a mixture of a nonreactive critical fluid and an alcohol such as methanol as the transesterification reactant; prior art teaches that these reactions have been induced to occur with or without an added catalyst (7).

For example, Nakayama, et al., (U.S. Pat. No. 6,960,672) teaches that a transesterification reaction between fats or oils and an alcohol in a supercritical or subcritical state can be used in the presence of a alkaline metal oxide, hydroxide, or carbonate catalyst to form fatty acid alkyl esters suitable for utilization as a biodiesel fuel.

Further, Han, et al., teaches that the supercritical methanol transesterification of soybean oil can by enhanced by the addition of carbon dioxide to the reaction mixture (8).

Further, Ginosar and Fox (U.S. Pat. No. 6,887,283) teaches a process to form a biodiesel fuel or lubricant comprising dissolving streams of a glyceride or free fatty acid containing substance in a stream of a critical fluid with or without a short chain alcohol cosolvent, combining this solution with a stream of a short chain alcohol or water, then reacting this mixture over a solid or liquid acidic or basic catalyst to form an alkyl ester and glycerol, then separating out the glycerol, then separating out the alkyl ester from the critical fluid medium, then recycling the critical fluid medium for use in a later reaction.

All prior art teaches the use of purified fats and oils as the feedstock for the transesterification reaction. Notably, none of the prior art anticipates the use of a supercritical solution to extract fats and oils from a solid vegetable feedstock and then utilize the extracted material directly by passing it from the extraction vessel into a reaction zone, solving the problem of needing to start with isolated oils and fats as a reactant. This inventive step allows for significant energy, time, and cost savings in the present invention.

ADVANTAGES

Accordingly one or more embodiments of the present invention may have one or more of the following advantages:

It is an advantage of the invention to provide a method for processing that uses solid biomass as a starting material feedstock and generates fatty acid alkyl esters suitable for use as a biodiesel fuel.

It is a further advantage of the invention that solid oilseed material can be used in the biodiesel fuel preparation process, without the need for prior isolation and purification of fats and oils from the oilseed.

The advantages would include a continuous, multistep process in which fat and oil-containing biomass is extracted with a critical fluid and zero to 20% of an alcohol cosolvent such as methanol, the extract is directed into a heated transesterification reaction zone with or without addition of a transesterification reactant alcohol such as methanol and with or without a solid phase catalyst, the glycerol and fatty acid alkyl ester products are then isolated, the spent biomass is removed, and the critical fluid and any excess alcohol used are recycled.

It is a further advantage to provide a biodiesel preparation process that can utilize wet biomass as a feedstock.

From the detailed description and diagrams herein, a number of advantages of the present invention are evident:

(a) The process reduces the cost of biodiesel production by obviating the need for using a separate, noncontiguous step for isolating and purifying fats and oils from biomass that is needed in all other biodiesel preparation processes (b) Because the process combines several steps in a novel manner, less total energy input is needed than if each step is conducted separately in the manner taught by the prior art.

(c) The process reduces the cost of biodiesel production by reducing the need for removing water from the reactants prior to transesterification that is needed in solution phase catalyst biodiesel preparation processes In order to solve the problems described above, an advantage of the present invention is to allow the preparation of fatty acid alkyl esters from solid biomass feedstock in a process that involves extraction of fats and oils with a supercritical fluid solvent comprising a combination of a solvent such as carbon dioxide and a short chain alcohol, directing the extract into a reaction region, effecting a transesterification reaction using heat, pressure, and with or without a solid-phase catalyst, removing glycerol and fatty acid alkyl ester products, removing wastes, and recycling the carbon dioxide and remaining alcohol.

DRAWINGS

Figures

FIG. 1 is a diagram depicting the invention in a first embodiment comprising an extractor 10, a reactor 12, and a separator 15, with means to add 20 and remove 22 feedstock to the extractor, means to add a supercritical fluid 24 such as carbon dioxide to the extractor, means to add alcohol cosolvent 26 such as methanol to the extractor, and means to remove fatty acid alkyl ester biodiesel products 38, glycerol product 34, wastes 46, and processing solvent and unused reactants 40 from the separator. Notably, other pressurized fluids can be utilized instead of carbon dioxide in this invention 24, with those skilled in the art recognizing that the supercritical fluid solvent 24 can be selected from a list of pressurized solvents including, but not limited to, carbon dioxide, hydrofluoroalkane HFA-134a, propane, n-butane, 2-methylpropane, chlorofluorocarbon CFC-11 (trichlorofluoromethane), chlorofluorocarbon CFC-12 (dichlorodifluoromethane) and chlorofluorocarbon CFC-22 (chlorodifluoromethane).

Figure 2:
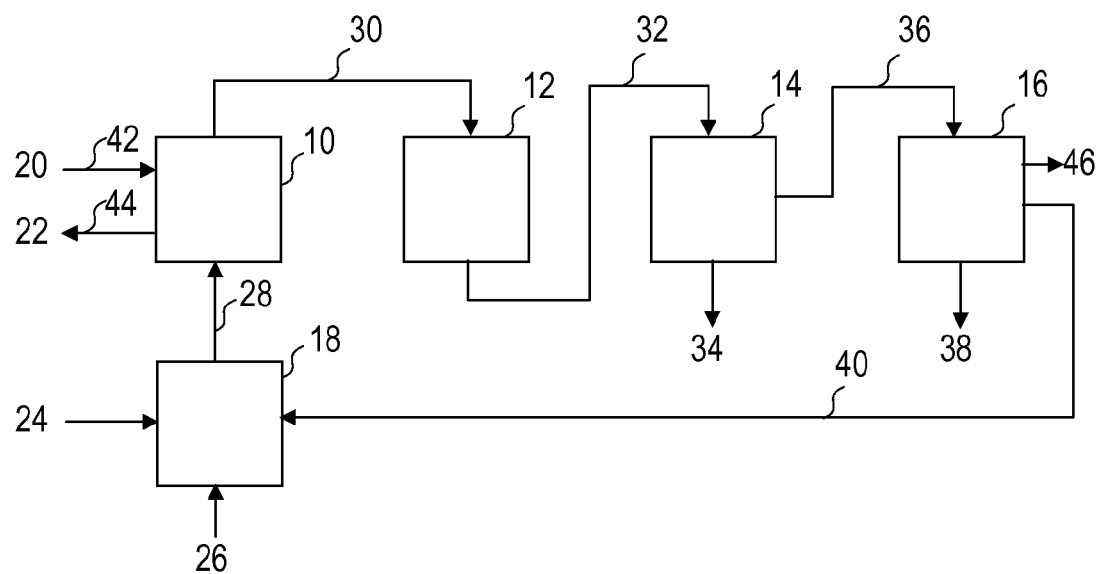

FIG. 2 is a diagram depicting another embodiment of the invention in which fats and oils are extracted from biological material 20 in an extractor 10 using a supercritical fluid solvent 24 and an alcohol 26 combined in a mixer 18 prior to introduction 28 into the extractor, and then said extracted fats and oils directed 30 into a reactor 12 wherein a transesterification reaction is induced to occur, forming the desired fatty acid alkyl esters 38.

Figure 3:
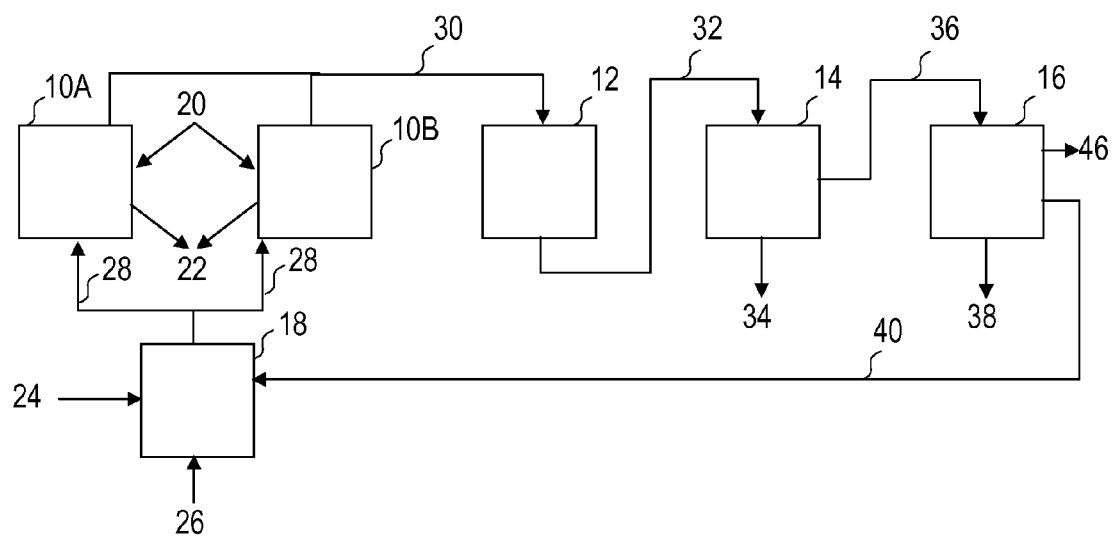

FIG. 3 is a diagram depicting another embodiment of the invention in which fats and oils are extracted from biological material 20 in a set of two extractors 10A and 10B using a supercritical fluid solvent 24 and an alcohol 26, using one extractor at a time for extraction while the other one is available for loading new biological material and removing spent biological material 22, then switching to use the other extractor while the previous one is unloaded and reloaded. The fats and oils extract is then directed 30 into a reactor 12 wherein a transesterification reaction is induced to occur, forming the desired fatty acid alkyl esters 38.

Figure 4:
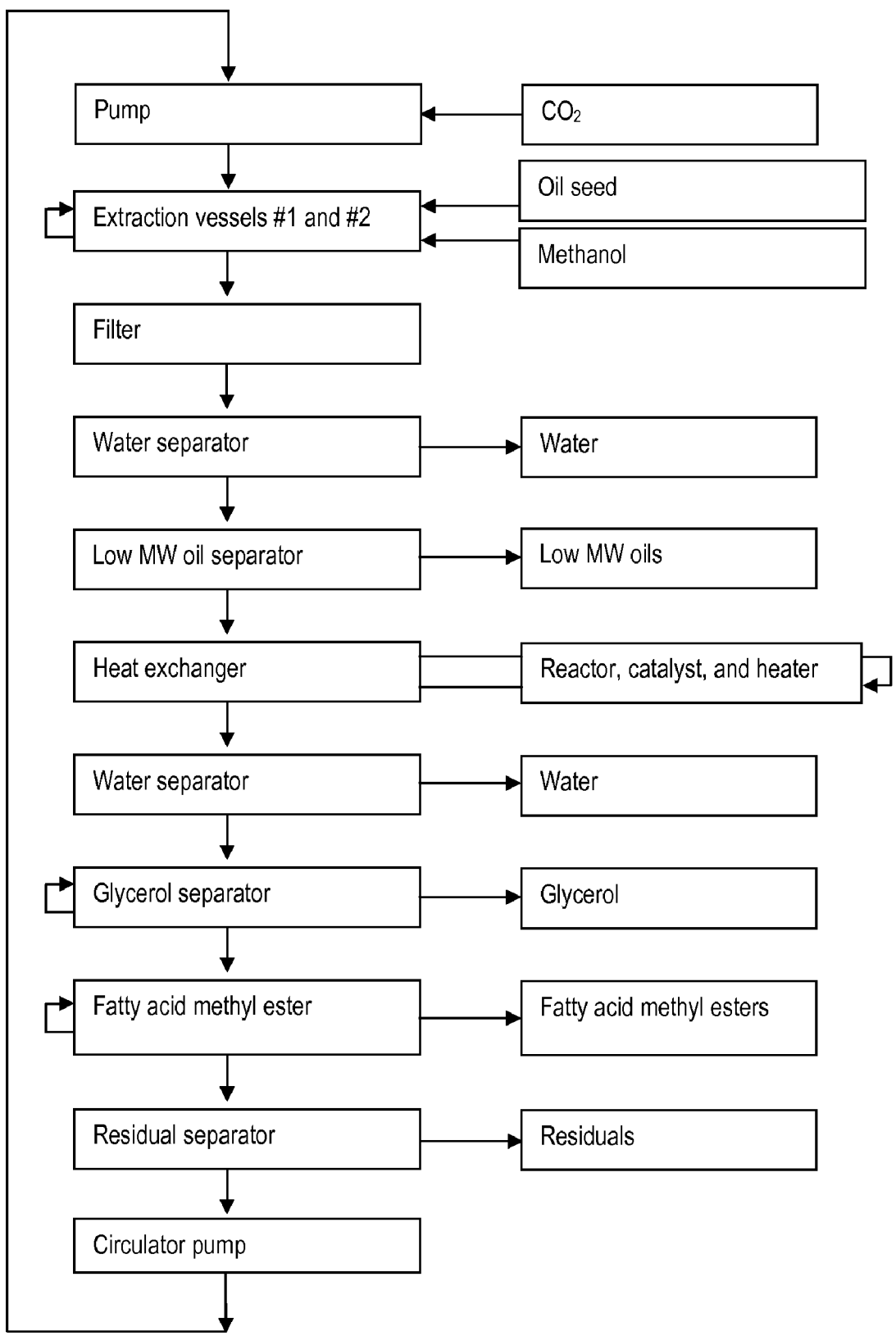

FIG. 4 is a diagram depicting another embodiment of the invention in which oil seed, or another biological feedstock that contains relevant fats and oils, is loaded into one of two extractions vessels, #1 and #2, along with methanol. Two extraction vessels are used in this embodiment so that one can be loaded and extracted with supercritical carbon dioxide while the other one is being unloaded and reloaded in preparation for reuse. Then the flow pattern is switched so that the second vessel is extracted while the first one is unloaded and reloaded, and the process is repeated going back and forth between the two extraction vessels. It is worth noting that the same type of vessel rotation could be effected using three or more vessels, too. The loaded vessel is extracted with supercritical carbon dioxide and methanol at set temperature and pressure and with or without recirculation, and the extracted materials are directed through a filter and a water separator—to remove some or all of the entrained water—and through a low molecular weight (MW) oil separator—to remove low MW oils—and then through a heat exchanger and into a heated reactor with or without an added catalyst present and with or without recirculation. Within the reactor, at set temperature and pressure conditions, a transesterification reaction occurs between the triglycerides, diglycerides, monoglycerides, free fatty acids, and methanol, and then the products are directed through a water separator, a glycerol separator with our without recirculation, and fatty acid methyl ester separator with or without recirculation—to remove biodiesel fuel product, and through a residual separator—to remove other chosen products, reactants, or contaminants prior to recycling the supercritical carbon dioxide solution back to the extractor(s) with a circulator pump. This embodiment demonstrates the unique and advantageous aspects of linking the oil extraction, transesterification reaction, and product separation steps for making biodiesel from biological feedstock, and indicates how the energy inputs can be reduced with such a combined system, compared to prior art processes.

Figure 5:
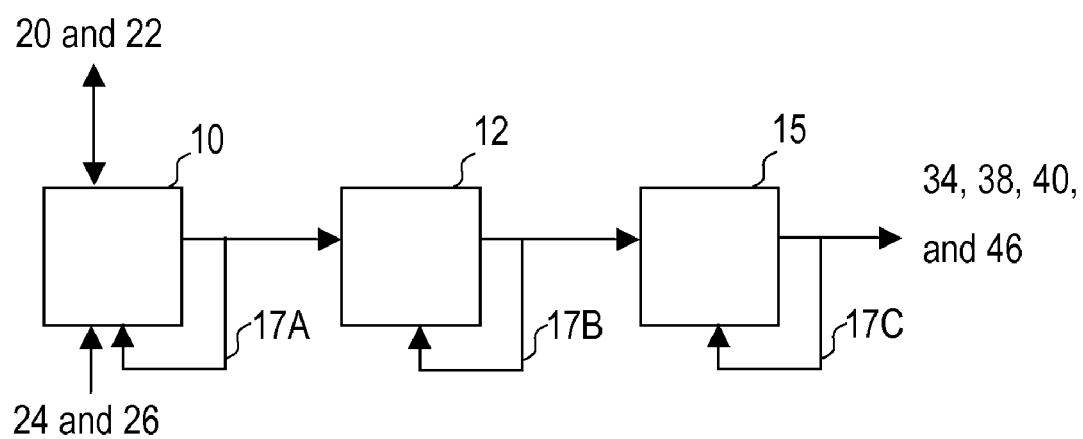

FIG. 5 is a diagram depicting another embodiment of the invention comprising an extractor 10, a reactor 12, and a separator 15, with means to add 20 and remove 22 feedstock to the extractor, means to add supercritical fluid solvent 24 to the extractor, means to add alcohol cosolvent 26 to the extractor, means to remove fatty acid alkyl ester biodiesel products 38, glycerol product 34, wastes 46, and processing solvent and unused reactants 40 from the separator, and recirculating means 17A, 17B, and 17C at one or more of the extraction, reaction, and separation steps to improve the efficiency of the process at the corresponding step. Those skilled in the art will recognize that the recirculating means is chosen from a group that includes, but is not limited to, a shaft-mounted stirrer, a magnetically-coupled stir bar, and a recirculating pump.

| DRAWINGS--REFERENCE NUMERALS | |
|---|---|
| 10 | Extractor |
| 10A | Extractor one (of two) |
| 10B | Extractor two (of two) |
| 12 | Reactor |
| 14 | First Separator |
| 15 | Separator |
| 16 | Second Separator |
| 17A | Recirculator one |
| 17B | Recirculator two |
| 17C | Recirculator three |
| 18 | Mixer |
| 20 | Fresh biomass feedstock |
| 22 | Spent biomass feedstock |
| 24 | Supercritical fluid solvent |
| 26 | Alcohol |
| 28 | Extraction solvent stream |
| 30 | Extracted fats and oils stream |

-continued

| DRAWINGS--REFERENCE NUMERALS | |
|---|---|
| 32 | Post-transesterification product stream |
| 34 | Glycerol product stream |
| 36 | Post-transesterification product stream with glycerol removed |
| 38 | Fatty acid alkyl ester product stream |
| 40 | Carbon dioxide and unused alcohol recycle stream |
| 42 | Input fresh biomass feedstock |
| 44 | Remove spent biomass feedstock |
| 46 | Waste stream |

DETAILED DESCRIPTION

Embodiments of the invention are depicted in FIGS. 1-4 and will be described below in reference to the Figures. To facilitate clarity in the description of crucial aspects of the invention, well-known components, circuits, manifolds, and procedures are not described in detail. The invention can, of course, take the form of additional embodiments, so the embodiments that are described are intended to describe and teach the invention without limiting the specific details of the invention. For example, the invention can utilize a multitude of different biological materials as the feedstock including, but not limited to, whole mustard seed, cracked mustard seed, whole or cracked mustard seed presoaked in methanol, whole soybeans, cracked soybeans, ground soybean meal, whole or cracked or ground soybeans presoaked in methanol. The extractor 10 is designed to remove fats and oils from any relevant biological materials which contain fats and/or oils. The extractor 10 is designed to be operated with control over temperature and pressure, which allows establishment of supercritical fluid extraction conditions, and extractor 10 allows enhancement of extraction by using pulsatile application of temperature or pressure changes. This type of extraction enhancement could be effected by sonication or by movement of a piston connected to the extractor.

One of ordinary skill in the art will be able to envision and practice the invention as described or in related, alternative embodiments.

In one embodiment, depicted in FIG. 1, an extractor 10 is directly linked to a reactor 12, which feeds into a separator 15, with means to add 20 and remove 22 feedstock to the extractor and means to remove fatty acid alkyl ester biodiesel products 38, glycerol product 34, wastes 46, and processing solvent and unused reactants 40 from the separator. Oilseed or other biological material containing relevant fats and oils is loaded 20 into the extractor 10 and the fats and oils are extracted with supercritical carbon dioxide and a short chain alcohol, including but not limited to methanol and ethanol, and the extracted material is directed into a reactor 12, in which the biodiesel-forming transesterification reaction is induced to occur, and then the reactor contents are directed into a into a separator 15, with means to remove fatty acid alkyl ester biodiesel products 38, glycerol product 34, wastes 46, and processing solvent and unused reactants 40.

DETAILED DESCRIPTION

Additional Embodiments

In another embodiment, depicted in FIG. 2, a biological material which contains fats and oils is obtained, and said biological material 20 is loaded 42 into an extractor 10 wherein the fats and oils are extracted from the biological material with a solution 28 containing supercritical carbon dioxide 24 and an alcohol 26. The fat- and oil-containing extract 30 is directed into a reactor 12 wherein a transesterification reaction is induced to occur in the extract using pressure, temperature and with or without an added catalyst to yield a stream 32 which comprises fatty acid alkyl esters and glycerol along with the supercritical carbon dioxide and excess methanol and any adventitious other components in the extract. This mixture 32 is then directed into a first separator 14 wherein glycerol product is removed 34, and then the glycerol-depleted mixture 36 is directed into a second separator 16 wherein a fatty acid alkyl ester product is removed 38 and wastes are removed 46 and carbon dioxide and excess, unreacted alcohol are recycled 40 back into the beginning of the process by mixing them in a mixer 18 with supercritical carbon dioxide 24 and alcohol 26 and directing this extraction solvent 28 into the extractor 10 for a new extraction of fat and oils.

An additional embodiment of the invention is depicted in FIG. 3. This embodiment further incorporates two extractors 10A and 10B instead of the one 10 shown in FIG. 1. This allows one extractor, e.g., 10A, loaded with biological material containing fats and oils 20 to be utilized for extraction while the other extractor, e.g., 10B, is available for removing spent biological material depleted of fats and oils 22 and loading new biological material 20. The fats and oils are extracted from the biological material in 10A or 10B, switching back and forth between the two as they get loaded and unloaded, with a solution 28 containing supercritical carbon dioxide 24 and an alcohol 26. The fat- and oil-containing extract 30 is directed into a reactor 12 wherein a transesterification reaction is induced to occur in the extract using pressure, temperature and with or without an added catalyst to yield a stream 32 which comprises fatty acid alkyl esters and glycerol along with the supercritical carbon dioxide and excess methanol and any adventitious other components in the extract. This mixture 32 is then directed into a first separator 14 wherein glycerol product is removed 34, and then the glycerol-depleted mixture 36 is directed into a second separator 16 wherein a fatty acid alkyl ester product is removed 38 and wastes are removed 46 and carbon dioxide and excess, unreacted alcohol are recycled 40 back into the beginning of the process by mixing them in a mixer 18 with supercritical carbon dioxide 24 and alcohol 26 and directing this extraction solvent 28 into the other extractor 10B or 10A for a new extraction of fat and oils. Then the steps are repeated with the extractors 10A and 10B switched.

An additional embodiment of the invention is depicted in FIG. 4, in which oil seed, or another biological feedstock that contains relevant fats and oils, is loaded into one of two extractions vessels, #1 and #2, along with methanol. The loaded vessel is extracted with supercritical CO2 and methanol, and the extracted materials are directed through a filter and a water separator (to remove some or all of the entrained water), and through a low molecular weight (MW) oil separator (to remove low MW oils) and then through a heat exchanger (to help optimize energy use for heating processes) and into a heated reactor with or without an added catalyst present. Within the reactor, a transesterification reaction is induced between the triglycerides, diglycerides, monoglycerides, free fatty acids, and methanol, and then the products are directed through a water separator (to remove unwanted water), a glycerol separator (to remove and collect the glycerol product), and fatty acid methyl ester separator (to remove and collect the biodiesel fuel product), and through a residual separator (to remove other possible products, unused reactants, or contaminants) prior to recycling the supercritical CO2 solution back to the extractor(s) with a circulator pump to be used in subsequent reaction/extraction/separation cycles.

DETAILED DESCRIPTION

Conclusions, Ramifications, and Scope

Skilled persons will appreciate that the apparatus of the present invention facilitates the production of biodiesel fatty acid alkyl ester products starting from fat- and oil-containing biological materials. It is anticipated that the novel improvements in the present invention will substantially reduce the time and expense of biodiesel fuel production.

In this invention, a stream containing carbon dioxide and an alcohol at elevated temperature and pressure is used in a linked extraction/reaction/separation process to extract fats and oils from biological material feedstock and transport the extracted fats and oils directly into a reaction chamber that is maintained at a chosen reaction temperature wherein a transesterification reaction is carried out between the extracted fats and oils and the alcohol with or without the involvement of a separate catalyst and with or without the introduction into the reaction chamber of additional alcohol. The extraction step and the reaction step are carried out with the carbon dioxide and alcohol solution pressurized and heated to a supercritical or subcritical state. According to the present invention, an improvement to biodiesel preparation is afforded by the simplification of the extraction and reaction processes into a single flowing system. Also according to the invention, a fatty acid alkyl ester product which can be effectively utilized as a biodiesel fuel substance can be efficiently prepared directly from biomass inputs without the need for prior extraction or other oil isolation processes.

We claim:

1. A method for preparing a fatty acid alkyl ester product from a fat- and oil-containing biological material feedstock comprising: contacting the biological material feedstock with a flowing solvent mixture wherein the solvent mixture is maintained at supercritical or near-critical pressure and temperature conditions;
   extracting fats and oils from the biological material feedstock with the flowing solvent mixture;
   flowing the extracted fat and oil-containing solution, under pressure, into a separate reaction region maintained at a desired temperature;
   effecting a transesterification reaction between the extracted fat and oil-containing solution and the flowing solvent mixture and an alcohol within the reaction region at supercritical conditions yielding reaction products comprising glycerol and fatty acid alkyl esters, and the flowing solvent mixture;
   flowing under pressure reaction products and into a separation region;
   collecting glycerol product;
   collecting fatty acid alkyl ester product;
   collecting wastes;
   collecting the flowing solvent mixture and any unused reactants.

2. The process according to claim 1, wherein the flowing solvent mixture comprises carbon dioxide and an alcohol with the alcohol at zero to 20% of the solvent mixture by volume.

3. The process according to claim 1, wherein stirring or recirculation is used in one or more of the extraction, reaction, and separation steps.

4. The process according to claim 1, wherein the collected solvent and any unused reactants are recycled back to the extractor for reuse in subsequent extraction.

5. The process according to claim 1, wherein the fat- and oil-containing biological material feedstock comprises whole mustard seed, mechanically-cracked mustard seed, ground mustard seed, whole soybeans, mechanically cracked soybeans, ground soybeans, whole rapeseed, mechanically-cracked rapeseed, or ground rapeseed.

6. The process according to claim 2, wherein the fat- and oil-containing biological material feedstock is presoaked in the same type of alcohol used in the extraction process.

7. The process according to claim 2, wherein the alcohol comprises methanol, ethanol, 1-propanol, 2-propanol, 1-butanol, or tert-butanol.

8. The process according to claim 1, wherein the flowing solvent mixture comprises methanol, ethanol, or 2-propanol.

9. The process according to claim 1, wherein the reaction region contains a solid phase catalyst.

10. The process according to claim 9, wherein the catalyst comprises a metal, metal oxide, or metal carbonate.

11. The process according to claim 1 wherein the step of extracting the fats and oils is enhanced by the use of pulsatile changes in the applied pressure or temperature during the extraction.

12. The process according to claim 1, wherein the flowing solvent mixture comprises hydrofluoroalkane, propane, n-butane, 2-butane, trichlorofluoromethane, dichlorodifluoromethane, or chlorodifluoromethane and an alcohol with the alcohol at zero to 20% of the solvent mixture by volume, wherein the alcohol comprises methanol, ethanol, 1-propanol, 2-propanol, 1-butanol, or tert-butanol.

\* \* \* \* \*